United States Patent [19]

Iwata

[11] Patent Number: 4,654,883
[45] Date of Patent: Mar. 31, 1987

[54] RADIO TRANSMITTER AND RECEIVER DEVICE HAVING A HEADSET WITH SPEAKER AND MICROPHONE

[75] Inventor: Keisuke Iwata, Tokyo, Japan

[73] Assignee: Iwata Electric Co., Ltd., Tokyo, Japan

[21] Appl. No.: 556,078

[22] Filed: Nov. 29, 1983

[30] Foreign Application Priority Data

Oct. 18, 1983 [JP] Japan ............... 58-160944[U]

[51] Int. Cl.[4] ............................................. H04B 1/38
[52] U.S. Cl. ................................... 455/89; 455/90; 379/430; 381/151
[58] Field of Search ............ 455/89, 90, 100, 351; 179/107 BC, 107 H, 121 C, 156 A

[56] References Cited

U.S. PATENT DOCUMENTS

| | | | |
|---|---|---|---|
| 3,122,847 | 3/1964 | Redfield et al. | 455/89 |
| 3,908,097 | 9/1975 | Higgins, Jr. | 179/156 A |
| 4,017,797 | 4/1977 | Laesig | 455/89 |
| 4,025,734 | 5/1977 | Aloupis | 179/107 BC |
| 4,138,598 | 2/1979 | Cech | 179/156 A |
| 4,150,262 | 4/1979 | Ono | 179/107 BC |
| 4,334,315 | 6/1982 | Ono et al. | 455/89 |

Primary Examiner—Jin F. Ng
Attorney, Agent, or Firm—Robert E. Burns; Emmanuel J. Lobato; Bruce L. Adams

[57] ABSTRACT

A radio transmitter and receiver device in which a head band has a transmitting microphone at one end and a receiving speaker at the other end. This microphone comprises a bone transmission type microphone for detecting aural oscillation of an external auditory canal transmitted through a bone tissue of a head portion from a mouth, said microphone being brought into contact with a side head portion at the rear of an ear. Thus, one ear is blocked by the speaker but the other ear is open, and therefore, a user can catch noises thereabout. A transmitting and receiving antenna has matching means and is mounted on the side of the speaker.

11 Claims, 4 Drawing Figures

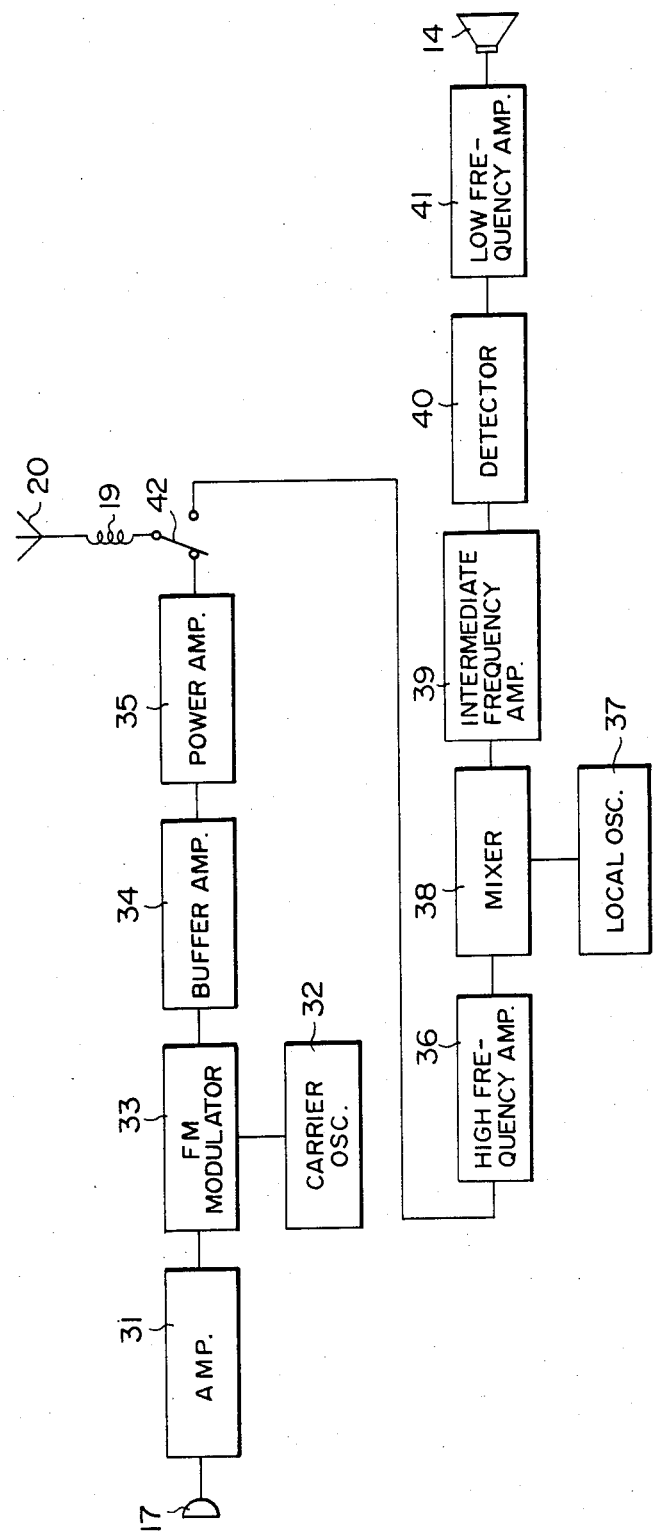

RADIO TRANSMITTER AND RECEIVER DEVICE HAVING A HEADSET WITH SPEAKER AND MICROPHONE

FIELD AND BACKGROUND OF THE INVENTION

The present invention relates to a radio transmitter and receiver device having a head band, one end of which is provided with a transmitting microphone and the other end provided with a receiving speaker, and more specifically to a radio transmitter and receiver device in which the transmitting microphone of a bone transmission type is employed so that a clear communication of radio conversation may be accomplished without picking up noises from the transmitting side.

For conversation between a plurality of persons who are at remote locations from each other, for example, at sites of construction work, places of work and group activities in schools, transceivers of a hand-free voice control type are widely used. Also, for conversation between a specific student and a teacher through a master unit and a daughter unit of a studying apparatus for foreign language, a transmitter and receiver device in which a speaker and a microphone are mounted on a head band is used as such apparatus.

The transmitter and receiver device in which a speaker and a microphone are integrally mounted on a head band is disclosed, for example, in U.S. Pat. No. 4,138,598. The transmitter and receiver device in said U.S. Patent has a speaker placed in contact with both ends of a head band so as to block the ears, and the other end of a bar having a microphone mounted on one end thereof is pivotably mounted on one end of the head band. In such a transmitter and receiver device, voice sounds emitted from the user's mouth and all kinds of noises resulting from external environments, for example, noises generated from architectural machines and the like, enter the microphone. As a consequence, a person who receives the voice input receives voice sounds which contain; these noises thereby making it difficult to discriminate the voice sounds. That is, one receives voice sounds which are poor in SN (signal-to noise) ratio thereby causing listener fatigue. Therefore, for example, in the site of work where industrial machines and civil engineering machines are driven, there has been posed a problem in that such a transmitter and receiver device fails to achieve good function in business conversation. In a transceiver using such a transmitter and receiver device, there has been posed a problem in that the above-described noises cause switching control of transmitting and receiving to make mistake, failing to make conversation. In other words, there has been a problem in that in the transmitter and receiver device which performs transmitting and receiving, receiving becomes impossible by deterioration of the ratio of voice sounds to noise sounds on the transmitter side.

In order to improve these disadvantages, a so-called bone transmission type microphone, which detects a voice oscillation of an external auditory canal transmitted through bone tissue of a head from the mouth, has been recently developed. Such a bone transmission type microphone is disclosed, for example, in U.S. Pat. No. 4,150,262. The bone transmission type microphone comprises a casing having an insert inserted into an external auditory canal, a retainer secured within said casing, a piezo-electric element having one end secured to said retainer and the other end positioned within the insert, and a lead wire for providing a polarization voltage from the piezo-electric element. With this structure, the oscillation of the external auditory canal generated when a voice sound is emitted is transmitted to the piezo-electric element, and the polarization voltage may be obtained through the lead wire from the piezo-electric element in accordance with the generation of strain as the result of said oscillation. This voltage is again regenerated as voice through an amplifier or the like, and subjected to necessary correction of voice, which is put out to the speaker to catch the voice. Thus, only clear voice can be received without introducing external noises into the microphone together with the aural signal.

If such a bone transmission type microphone is incorporated into the transmitter and receiver together with a head phone as described above, both the left and right ear holes are blocked by the head phone and microphone, respectively. If this device is used at the site of construction work, external alarm, noises of movement of machines or the like do not directly enter the ears, and this poses a very dangerous condition.

OBJECTS OF THE INVENTION

It is an object of the present invention to provide a radio transmitter and receiver device which can make response by radio while receiving clear voice sounds without blocking both ears, while improving the disadvantages noted above with respect to the prior arts.

In accordance with the present invention, there is provided a radio transmitter and receiver device comprising a hair band held on the head of a user, a speaker mounted on one end of said hair band and positioned so as to block one of the ears, a bone transmission type microphone mounted on the other end of the hair band and placed in contact with a side head portion at the rear of the other ear, and an antenna with matching means mounted on the head band.

In accordance with a preferred embodiment of the present invention, the bone transmission type microphone comprises a pad in contact with the side head portion, a diaphragm for fixing said pad, and a piezoelectric element adhered to said diaphragm. Voice on the transmitting side picks up aural oscillations transmitted to the side head portion by the diaphragm. The antenna with matching means is mounted on the hair band on the speaker side.

In the radio transmitter and receiver device of the present invention, it is possible to make transmitting and receiving conversation without blocking both ears and without interference of environmental noises around the transmitter side to make possible the clear transmitting and receiving of voices. Further, external voice sounds or noises can be heard through the ear on the microphone side, and therefore, it is possible to simultaneously make normal conversation with a person who does not wear this device.

BRIEF DESCRIPTION OF THE DRAWINGS

FIG. 4 is a block diagram showing one embodiment of an electric control circuit.

DESCRIPTION OF THE PREFERRED EMBODIMENTS

Figure 1:
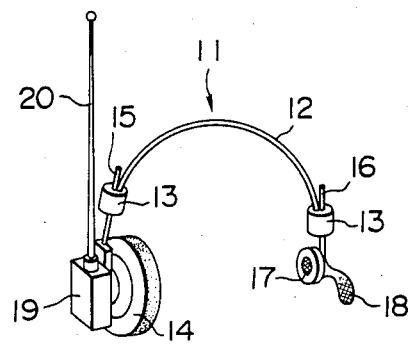
FIG. 1 is a headset used with the perspective view showing one embodiment of a headset used with the radio transmitter and receiver device in accordance the present invention.

In FIG. 1, a headset of the radio transmitter and receiver device in accordance with the present invention is generally indicated as at 11. In the headset 11, retainer members 13 formed of synthetic resin or the like having a low coefficient of friction are mounted on both ends of a head band 12 formed of an elastic material. The other end of a sliding rod 15, on one end of which is mounted a head phone type or earphone speaker 14 positioned so as to block an ear hole, is slidably retained on one retainer member 13 with a certain degree of contact resistance. The other end of a sliding rod 16, on one end of which is mounted a bone transmission type microphone 17, is slidably retained on the other retainer member 13. A locking piece 18 to be hooked on the upper portion of the ear is projected on the bone transmission type microphone 17. On the other hand, matching means 19 for delivering and receiving high frequency energies in spaces for a transmitter and a receiver necessary for radio communication is mounted on the earphone speaker 14. A transmitting and receiving antenna 20 is mounted on the matching means 19. When the device is used, the antenna is raised to a high position to enhance the effective value of the antenna.

Figure 2:
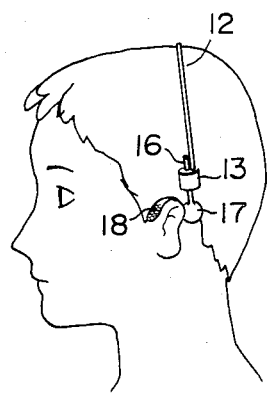
FIG. 2 is a view showing the wearing condition of the headset shown in FIG. 1.
Figure 3:
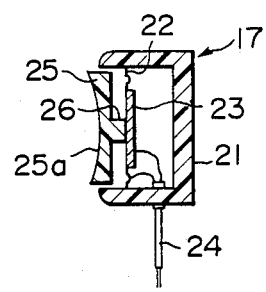
FIG. 3 is a sectional view showing one embodiment of a bone transmission type microphone in FIG. 1.

The bone transmission type microphone 17 comes into contact with a side head portion at the rear of the other ear when the head band 11 is put on the user'head and the earphone speaker 14 comes into contact with one ear as shown in FIG. 2. The locking piece 18 is provided to make the locking position of the microphone 17 accurate and stabilized. The bone transmission type microphone 17 comprises, as shown in FIG. 3, a synthetic resin housing 21, of which the side thereof in contact with the side head portion of the user is open, and a flexible diaphragm 22 provided so as to block an opening of the housing 21. A piezo-electric crystal element 23 in which strain is generated as the diaphragm 22 oscillates, is adhered to the side of the flexible diaphragm 22 on the side of the housing 21. This piezoelectric element 23 is polarized by generation of strain, and the polarization voltage is removed from the diaphragm 26 and piezo-electric element 23 through a lead wire 24. A projection 26 is secured to the other side of the diaphragm 22, said projection 26 being integrally formed on a pad 25. The pad 25 is placed in close contact with the side head portion of the user at the rear of the ear, and therefore, one side 25a thereof is formed into a curved surface having a curved contour. Since the principle of the bone transmission type microphone is described in detail in the aforementioned U.S. Pat. No. 4,150,262, an explanation thereof will be omitted.

FIG. 4 is a block diagram showing an electric structure employed in the present invention. A signal from the bone transmission microphone 17 is applied to a transmitter circuit. The transmitter circuit comprises an amplifier 31 for correcting an amplitude level characteristic within an aural band to amplify a signal from the microphone 17, a carrier wave oscillator 32 for oscillating a carrier wave, an FM modulator 33 for modulating a carrier wave from the carrier wave oscillator 32 by an output signal of the amplifier 31, a buffer amplifier 34, a power amplifier 35 and the like. On the other hand, the receiver circuit comprises a high frequency amplifier 36 for amplifying a signal received from the antenna 20, a local oscillator 37, a mixer circuit for mixing signals from the amplifier 36 and oscillator 37, an intermediate frequency amplifier 39, a detector circuit 40 and a low frequency amplifier 41. An output of the amplifier 41 is connected to the speaker 14. The antenna 20 is connected, for use in common to transmitting and receiving, to an antenna maneuvering switch 42 through the antenna matching means 19. Since these elements are the same as a circuit for a conventional transceiver, a detailed description thereof will be omitted. The aforesaid transmitter and receiver circuit is housed in a casing (not shown), which is in turn held by a belt or the like of a user.

As described above, in the bone transmission type microphone 17, the voice sound generated within the mouth of a person is formed into oscillation, which is transmitted to the bone tissue of the side head portion, and said oscillation is transmitted with high sensitivity to the diaphragm 22 through the pad 25 in contact with the side head portion. Therefore, strain is generated in the piezo-electric crystal element 23 in accordance with the oscillation of the diaphragm 22, and polarization voltage corresponding to said strain is produced and applied to an input circuit of the amplifier 31 in the transmitter circuit through the lead wire 24. This voltage is amplified by the amplifier 31 and is received by another receiver by radio from the antenna 20 through the transmitter circuit. The other receiver can receive clear voice sounds without receiving at all environmental noises in the periphery of the transmitting person. In addition, in the transmitter and receiver device of the present invention, both ears are not blocked as described above, and therefore, the user can hear other voices and sounds in the vicinity of the device. Thus, it is possible to send clear aural wave without being impaired by noises generated during the civil engineering work, and a danger involved in the user such as the conventional case wherein both ears are blocked can be avoided.

What is claimed is:

1. A headset having only one earphone speaker for use with a wireless transmitting and receiving device and capable of being worn on the head of a user without blocking both of the user's ears, the headset comprising: a head band dimensioned and configured to be worn on the head of a user of the headset; speaker means consisting of only one earphone speaker attached to the head band at a position in which the speaker blocks one of the user's ears during use of the headset; and a bone transmission type microphone attached to the head band at a position in which the microphone contacts a side portion of the user's head at the rear of the other of the user's ears without blocking the same to enable the microphone to receive bone-transmitted voice sounds made by the user during use of the headset.

2. A headset according to claim 1; including means attachable over the user's other ear for holding the microphone in place at the rear of the user's other ear.

3. A headset according to claim 2; wherein the microphone comprises a pad for contacting the user's head at the rear of the user's other ear, a diaphragm connected to the pad and mounted to undergo oscillation in response to oscillating movement of the pad caused by bone-transmitted voice sounds, and a piezoelectric element connected to the diaphragm for producing an output voltage representative of the voice sounds in response to strains developed therein by oscillation of the diaphragm.

4. A headset according to claim 3; wherein the pad has a curved contour on the side thereof which contacts the user'head.

5. A headset according to claim 2; including means for adjustably attaching the speaker and the microphone to the head band to enable their positions to be adjusted to accommodate users of different size.

6. A headset according to claim 2; including an antenna connected to the head band in the vicinity of the speaker.

7. A headset according to claim 1; wherein the microphone comprises a pad for contacting the user's head at the rear of the user's other ear, a diaphragm connected to the pad and mounted to undergo oscillation in response to oscillating movement of the pad caused by bone-transmitted voice sounds, and a piezoelectric element connected to the diaphragm for producing an output voltage representative of the voice sounds in response to strains developed therein by oscillation of the diaphragm.

8. A headset according to claim 7; wherein the pad has a curved contour on the side thereof which contacts the user's head.

9. A headset according to claim 1; including means for adjustably attaching the speaker and the microphone to the head band to enable their positions to be adjusted to accommodate users of different size.

10. A headset according to claim 1; including an antenna connected to the head band in the vicinity of the speaker.

11. A headset according to claim 1; wherein the head band has two ends, the earphone speaker being attached to one end thereof and the microphone being attached to the other end thereof.

* * * * *